(12) United States Patent
Lin et al.

(10) Patent No.: US 12,731,742 B2
(45) Date of Patent: Sep. 8, 2026

(54) MAGNETIC ANALOG SWITCH AND SUBSTRATE

(71) Applicant: Logitech Europe S.A., Lausanne (CH)

(72) Inventors: Feng-Hao Lin, Hsinchu City (TW); Jérémie Willemin, Bussigny (CH); Yu-Lun Lin, Miaoli County (TW); Ranjith Hosur Ganesh, Hsinchu City (TW); Yu-Sen Chen, Hsinchu County (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 19/063,129

(22) Filed: Feb. 25, 2025

(65) Prior Publication Data

US 2026/0253816 A1 Aug. 27, 2026

(51) Int. Cl.
*H01H 13/14* (2006.01)
*G06F 3/02* (2006.01)
*G06F 3/023* (2006.01)

(52) U.S. Cl.
CPC ........... *H01H 13/14* (2013.01); *G06F 3/0202* (2013.01); *G06F 3/023* (2013.01)

(58) Field of Classification Search
CPC ........ H01H 13/14; G06F 3/0202; G06F 3/023
See application file for complete search history.

(56) References Cited

U.S. PATENT DOCUMENTS

2008/0278354 A1* 11/2008 Garrett .................. H03M 11/06 341/32
2020/0365348 A1* 11/2020 Takamori ............. H01H 36/004
2022/0171470 A1* 6/2022 Drezet ..................... G06F 3/016
2022/0407515 A1* 12/2022 Bruwer ................ H03K 17/952
2023/0012830 A1* 1/2023 Rosenberg ............ G06F 3/0202

* cited by examiner

*Primary Examiner* — Amit Chatly
(74) *Attorney, Agent, or Firm* — Kilpatrick Townsend & Stockton LLP

(57) ABSTRACT

A keyed device comprising a substrate and a keyswitch mounted thereon. The keyswitch includes a plunger operable to be depressed and move between a first position and a second position defining a range of motion, and a magnet coupled to the plunger. When the plunger is depressed, the magnet is operable to pass through an opening of the substrate, such that when the plunger is in the first position, the magnet is configured above the opening in the substrate, and wherein the plunger is in the second position, at least a portion of the magnet is configured below the opening in the substrate. A magnetic field sensor is coupled to the substrate and configured to detect a positive and negative magnetic field generated by the magnet over the range of motion of the plunger.

10 Claims, 9 Drawing Sheets

MAGNETIC ANALOG SWITCH AND SUBSTRATE

BACKGROUND

Computer peripheral devices are commonplace in modern society and are typically used to convert human-induced analog inputs (e.g., touches, clicks, motions, touch gestures, button presses, scroll wheel rotations, etc.) made in conjunction with computer peripheral devices into digital signals for computer processing. A computer peripheral device, or more broadly, an input device, can include any device that can provide data and control signals to a computing system. Some non-limiting examples of input devices include keyboards, computer mice, virtual reality and/or augmented reality controllers, touch pads, remote controls, gaming controllers, joysticks, trackballs, presenters, and the like.

Input devices have undergone many marked improvements over the last several decades. In some contemporary input devices, such as keyboards, analog keys have become popular for certain applications like competitive gaming. Analog keys can provide better resolution in key press detection that extends beyond a simple make or break connection, as found in conventional galvanic keyswitches, but are often susceptible to reduced performance characteristics such as poor linearity and dead zones, among other problems. As such, better solutions are needed.

Unless otherwise indicated herein, the materials described in this section are not prior art to the claims in this application and are not admitted as being prior art by inclusion in this section.

BRIEF SUMMARY

In some embodiments, a keyed device (e.g., keyboard) can comprise: a substrate (e.g., printed circuit board (PCB)) defining an opening; a keyswitch mounted on the substrate, the keyswitch including a plunger operable to be depressed and move between a first position and a second position defining a range of motion; a magnet coupled to the plunger, wherein when the plunger is depressed, the magnet is operable to pass through the opening of the substrate, such that: when the plunger is in the first position, the magnet is configured above the opening in the substrate; and wherein the plunger is in the second position, at least a portion of the magnet is configured below the opening in the substrate; and a magnetic field sensor coupled to the substrate and configured to detect the magnetic field generated by the magnet over the range of motion of the plunger. In some cases, the magnetic field sensor (e.g., tunneling magnetoresistance (TMR) sensor) detects the magnetic field over a positive range of the magnetic field and a negative range of the magnetic field. In some cases, the range of motion of the plunger defines an axis, and wherein the TMR sensor is mounted on the substrate at a position lateral and normal to the axis. The keyswitch can be a magnetic keyswitch and may be an analog keyswitch or a hybrid (e.g., including a galvanic contact).

In some embodiments, a system comprises: a substrate (e.g., PCB) with a surface that defines an opening; a keyswitch (e.g., magnetic analog keyswitch) mounted on the substrate; a plunger with a magnet configured thereon, the plunger operable to depressed over a range of motion that passes through the opening of the substrate; and a magnetic field sensor (e.g., TMR sensor) coupled to the substrate and operable to: detect a magnetic field of a first polarity when the magnet is above the opening and the magnetic sensor; detect a magnetic field of a second polarity opposite the first polarity when the magnet is below the opening and the magnetic sensor; and generate a signal corresponding to an amount that the plunger is depressed over the range of motion based on a magnitude of the detected magnetic field in the first and second polarities. In some cases, the range of motion of the plunger defines an axis, and wherein the TMR sensor is mounted on the substrate at a position lateral and normal to the axis.

In certain embodiments, a method of operating a keyed device, the method comprising: measuring a magnetic flux of a magnet coupled to a plunger of a magnetic keyswitch when the magnet is configured in a first position along a range of motion of the plunger; measuring a magnetic flux of the magnet when the magnet is configured in a second position along the range of motion of the plunger; determining a difference measurement of the magnetic flux between the second position and the first position; determining that the magnetic keyswitch is a first type of keyswitch when the difference measurement is a positive data value; determining that the magnetic keyswitch is a second type of keyswitch when the difference measurement is a negative data value; and calibrating an operating voltage for the magnetic keyswitch based on the determined type of keyswitch. In some aspects, the method can include determining that the magnetic keyswitch is a third type of keyswitch when the measured magnetic flux of the magnet in the first position is of a different polarity than the measured magnetic flux of the magnet in the second position. In some cases, the first position corresponds to a plunger of the keyswitch being between 0 and 20% fully pressed along the range of motion, and wherein the second position corresponds to the plunger of the keyswitch being between 80-100% fully pressed along the range of motion. In some embodiments, the measuring of the magnetic flux of the magnet is performed by a TMR sensor. In some embodiments, the TMR sensor and the magnetic keyswitch are mounted on a substrate, the range of motion of the plunger defines an axis, and the TMR sensor is mounted on a substrate at a position lateral and normal to the axis. In some cases, the substrate can be a PCB, the keyswitch can be a magnetic analog keyswitch or hybrid type, and the keyed device may be a keyboard.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
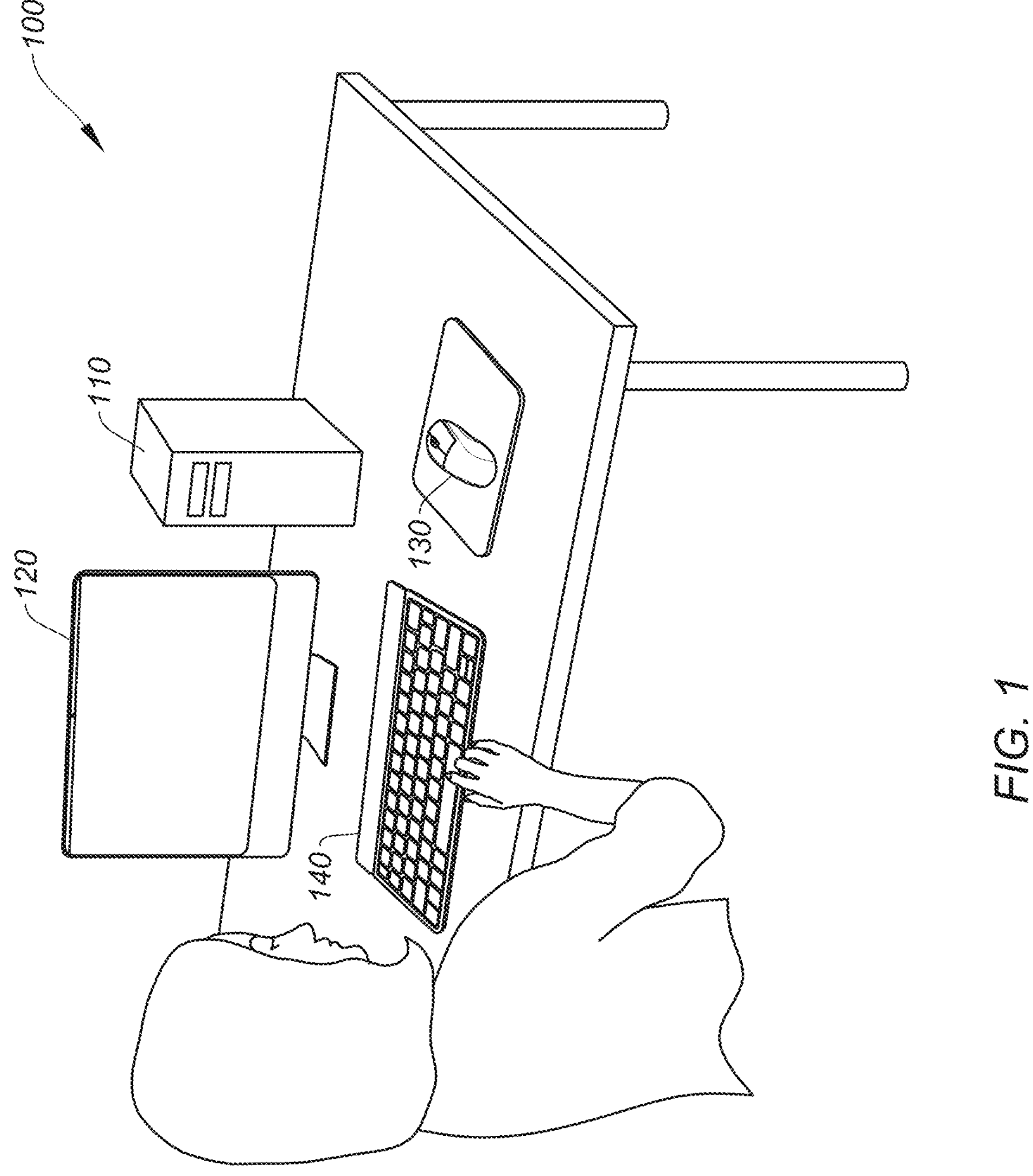
FIG. 1 shows a simplified example of a computer system 100 that can include any of a variety of host computing devices and computer peripheral devices, including computer peripheral devices (e.g., a keyed device, such as a keyboard, etc.) that can be configured to perform aspects of the various inventive concepts described herein.

Aspects of the present disclosure relate generally to computer peripheral devices, and more particularly to analog keyswitch systems, according to certain embodiments.

In the following description, various examples of magnetic analog key structures are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to magnetic key structures for a keyed input device, such as a keyboard or the like. Conventional magnetic analog key structures detect linear (e.g., vertical) movement of a magnet coupled to a plunger by a magnetic sensor (e.g., Hall sensor) typically mounted in-line and coaxially with the plunger and magnet that limits the range of motion of the plunger (e.g., 4 mm) to the top surface of the substrate and only allows single polarity magnetic field measurements. Some technical problems and deleterious conditions with these types of implementations include the presence of dead zones (e.g., areas at the beginning and end of the range of motion (e.g., 0 mm and 4 mm, respectively) where sensing is too non-sensitive and sensitive (e.g., saturation), respectively, as well as inherently poor linearity. Alternatively, and preferably, the novel embodiments described herein (see, e.g., FIG. 4B) can significantly mitigate these problems with better performance, lower cost, and with consistent and robust performance.

Aspects of the present disclosure provide technical solutions to the technical problems described above through the use of novel key switch architectures. In some non-limiting embodiments, a substrate includes a keyswitch coupled thereon with a magnet that passes through a hole in the substrate as a keyswitch plunger is depressed, such that the range of motion of the plunger and magnet is above and below the substrate. The magnetic field generated by the magnet is detected by a magnetic field sensor (e.g., tunneling magnetoresistance (TMR) sensor) mounted on the substrate (e.g., on the top or bottom) at a location lateral to an axis defined by the range of motion of the plunger, and the magnetic field sensor can detect both magnetic poles of the magnet as it passes though the substrate. This allows the magnet to be closer to the magnetic sensor over its full range of motion (e.g., 4 mm). For example, instead of being 4 mm from the magnet when the plunger is at rest (e.g., no pressed), which may be a dead zone, the 4 mm range of motion can be configured to be 2 mm above the substrate and 2 mm below the substrate, such that the magnetic sensor is always only 2 mm away. This can reduce or eliminate dead zones and improve linearity and resolution in the magnetic field measurement over a significantly larger portion of the plunger's range of motion, making for significantly improved analog key press measurements, as would be appreciated by one of ordinary skill in the art with the benefit of this disclosure, and as further described below at least with respect to FIG. 4B-FIG. 9.

In further aspects, novel systems for keyed devices that support swappable keyswitch capabilities may correctly identify keyswitch types based on magnetic field characteristics over a range of motion. Keyswitch types can vary. For example, some keyswitch types may have magnetic fields with only positive single polarity measurements, while others may have only negative single polarity measurements. Some novel keyswitch embodiments described herein may operate with both positive and negative magnetic field measurement, as described above. In certain embodiments, keyswitch types may be determined by analyzing magnetic field measurements at or near the ends of the range of motion (e.g., between 0-1 mm and 3-4 mm, respectively), among other keyswitch characteristics described below, and allow the system (e.g., keyed device) to properly bias the keyswitch and perform magnetic field measurements over an expected corresponding range. This is further discussed below at least with respect to FIGS. 6-9.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 can include computer 110, monitor 120, computer mouse 130, and keyboard 140. In some cases, keyboard 140 can be a "qwerty" style keyboard, or any suitable input device (e.g., internet-of-things device, AR/VR controller, remote controller, or the like) with one or more keys that can be configured as analog keys with travel and force detection, as further described throughout this disclosure. For computer system 100, keyboard 140 can be configured to control various aspects of computer 110 and monitor 120, as would be appreciated by one of ordinary skill in the art with the benefit of this disclosure. The monitor 120, computer mouse 130, and keyboard 140 may be referred to generally as "computer peripheral devices" or "input devices." Computer peripheral devices 120-140 can be communicatively coupled to host computing device 110 and, in some cases, may be coupled to multiple host computing devices. Although many of the examples presented herein utilize analog keys in a keyboard-type computer peripheral device, it would be understood by those of ordinary skill in the art with the benefit of this disclosure that the usage of such structures can be applied to other types of input devices.

Computer 110 can be any suitable computing device including, but not limited to, a desktop computer, a laptop computer, a tablet or "phablet" computer, a smartphone, a PDA, a wearable device (e.g., smart watches, smart glasses), virtual reality/augmented reality (VR/AR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor(s) 210 of FIG. 2) to control aspects of the host computing device, for instance, via the one or more computer peripheral devices.

Figure 2:
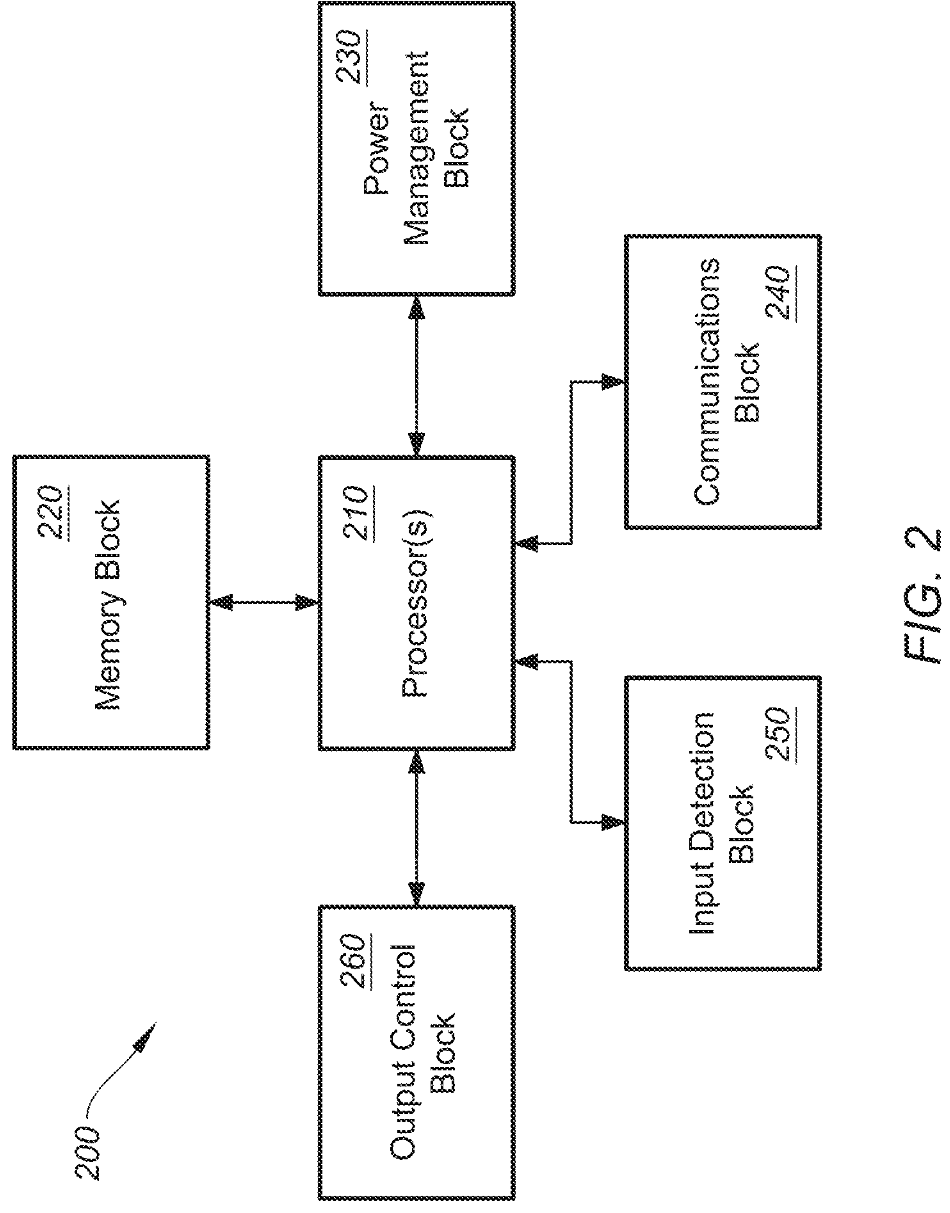
FIG. 2 shows a system for operating a computer peripheral device, according to certain embodiments.

FIG. 2 shows a system 200 for operating a computer peripheral device (e.g., computer mouse 130, keyboard 140, etc.), according to certain embodiments. Aspects of system 200 may be configured to operate any of the computer peripheral devices shown or not shown herein but within the wide purview of the present disclosure. System 200 may include processor(s) 210, a memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate blocks, or alternatively, more than one system block may be implemented in a single block. In the context described herein, system 200 can be incorporated into any computer peripheral devices (e.g., input devices) described or mentioned herein and may be further configured with any of the embodiments presented herein (see, e.g., FIG. 4B), as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of keyboard 140 (e.g., system blocks 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, Lightspeed, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor(s) 210 to perform some or all of the various methods described throughout this disclosure. In some embodiments, multiple processors may enable increased performance characteristics in system 200 (e.g., speed and bandwidth), however, multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor (s) 210). Software can be implemented as a single program or a collection of separate programs and can be stored in non-volatile storage and copied in whole or in part to volatile working memory during program execution. In some embodiments, memory 220 may store data corresponding to inputs on the computer peripheral device, such as a detected movement of the computer peripheral device, a sensor (e.g., optical sensor, accelerometer, etc.), activation of one or more input elements (e.g., buttons, sliders, touch-sensitive regions, etc.), or the like. Stored data may be aggregated and sent via reports to a host computing device.

In certain embodiments, memory 220 can store the various data described throughout this disclosure. Memory 220 can be used to store any suitable data to perform any function described herein and as would be appreciated by one of ordinary skill in the art with the benefit of this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing-by-processing devices. Software can be implemented as a single program or a collection of separate programs and can be stored in non-volatile storage and copied in whole or in part to volatile working memory during program execution. From a storage subsystem, processing devices can retrieve program instructions to execute various operations (e.g., software-controlled switches, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 230 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cables to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys, or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor(s) 210, or in combination therewith.

In some embodiments, input detection module 250 can detect a touch or touch gesture on one or more touch sensitive surfaces on keyboard 140. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities.

Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., TMR, etc.), or the like.

Input detection module 250 may include a movement tracking sub-block that can be configured to detect a relative displacement (movement tracking) of a computer peripheral device. For example, input detection module 250 optical sensor(s) such as IR LEDs and an imaging array of photodiodes to detect the movement of a computer peripheral device relative to an underlying surface. A computer peripheral device may optionally include movement tracking hardware that utilizes coherent (laser) light. Movement tracking can provide positional data (e.g., delta X and delta Y data from the last sampling) or lift detection data. For example, an optical sensor can detect when a user lifts the computer peripheral device (e.g., computer mouse 130) off an underlying surface (also referred to as a "work surface") and can send that data to processor(s) 210 for further processing. In some embodiments, processor(s) 210, the movement tracking block (which may include an additional dedicated processor), or a combination thereof, as would be appreciated by one of ordinary skill in the art with the benefit of this disclosure.

In certain embodiments, accelerometers can be used for movement detection.

Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMID, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer (s) to determine movement or input device orientation. In some embodiments, input detection block 250 can control aspects of one or more sensing elements, as described herein.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus subsystem to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations (e.g., by programming a processor or providing appropriate control circuitry) and various blocks might or might not be reconfigurable depending on how the initial configuration is obtained.

System 200 can be applied in whole or in part (e.g., a subset of system blocks 210-260), or with additional blocks to realize the various inventive concepts described herein. In some cases, multiple systems 200 or portions thereof can be applied to a computer peripheral device. For example, some or all of the smart keyswitch embodiments described herein (see, e.g., FIGS. 6A-9) can incorporate aspects of system 200 to control sensing (e.g., optical, inductive, magnetic, mechanical), communication via I/O lines, wireless communications in some cases, output control (e.g., LEDs, haptics, etc.), or any other aspect via blocks 210-260, as would be appreciated by one of ordinary skill in the art with the benefit of this disclosure.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other subsystems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to apply to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
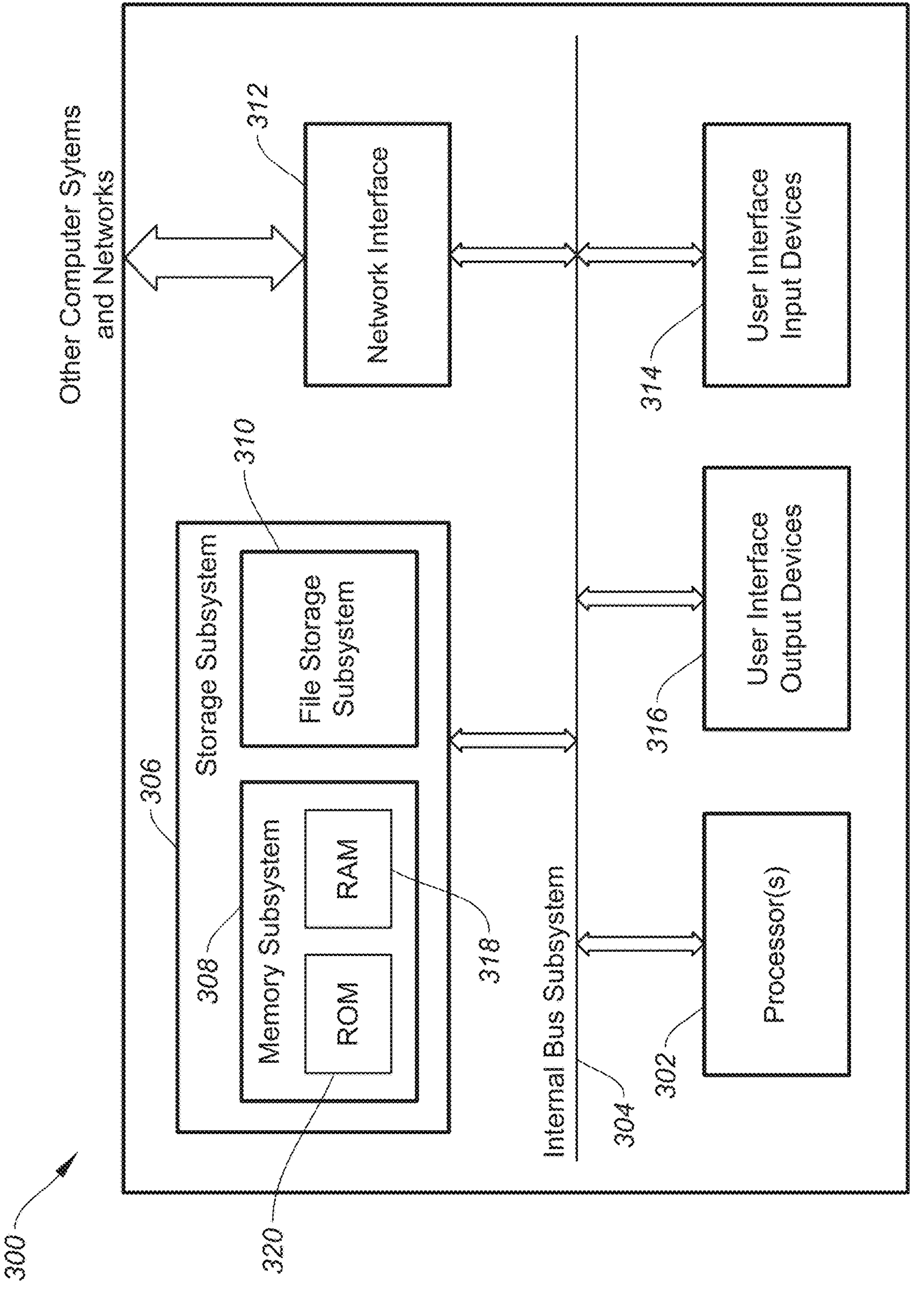
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed-up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing the methodologies described herein. Code modules (e.g., instructions stored in memory) may be implemented within a processor or external to the processor. As used herein, the term "memory" refers to a type of long term, short term, volatile, nonvolatile, or other storage medium, and is not to be limited to any particular type of memory or number of memories, or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps, and means described throughout the present disclosure may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special-purpose computer system.

Computer programs incorporating various features described herein (e.g., in one or more code modules) may be encoded and stored on various computer readable storage media.

Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations (e.g., by programming a processor or providing appropriate control circuitry) and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Magnetic Analog Keyswitch with Substrate Pass-Through

Aspects of the present disclosure include the use of novel keyswitch systems that incorporate substrate pass-through architectures to provide improved sensitivity, linearity, and resolution with magnetic sensing and to mitigate or eliminate dead zones. In conventional magnetic analog keyswitch systems, the keyswitch is mounted on a substrate, and a magnet (typically coupled to the keyswitch plunger) moves along a range of motion that is entirely above the substrate. A Hall sensor is typically coupled to the substrate and configured in axial alignment with the range of motion of the plunger and/or magnet (e.g., configured in a z-direction from the magnet)—typically directly below the plunger on the substrate. The Hall sensor can then sense the magnetic field of the magnet as the keyswitch moves from an unpressed state to a fully pressed state (e.g., typically 4 mm of travel). In the unpressed state (e.g., 0 mm travel), the magnet is farthest from the magnetic sensor and weak or inconsistent measurements may result (also known as a dead zone). In the fully pressed state, the magnet is closest to the sensor and may saturate the sensor beyond its range of detection. Thus, conventional systems may only have reliable (e.g., linear or semi-linear) single-polarity magnetic field measurements over a shorter travel distance than the full range of motion of the plunger (e.g., 3 mm of a 4 mm travel distance). Magnetic field measurements, as described herein, are typically magnetic flux values that can be represented by analog-to-digital conversion (ADC) values that can span about 1250 LSB (least significant bit) for conventional embodiments, and about 2500 or more for the novel embodiments presented herein (see, e.g., FIG. 7). The ranges are typically offset. For instance, a conventional magnetic keyswitch may range from 2500 to 4000, but typically not more than 1500 LSB in overall range. Wider or narrower ranges are possible for the novel embodiments described herein (e.g., up to 4000 LSB in range or more), with the larger ranges generally corresponding to better measurement resolution, as further described below. One of ordinary skill in the art with the benefit of this disclosure would appreciate the many modifications, variations, and alternative embodiments thereof.

In some embodiments of the present disclosure, the magnet on the plunger can pass through an opening within the substrate, such that a substrate-mounted sensor can perform dual-polarity magnetic field measurements as the magnet moves above and below the substrate. The position of the laterally oriented sensor (as opposed to the axially oriented sensor (z-axis) of conventional systems) can be configured such that linear or near-linear sensing can be possible over a larger portion of the range of motion. In some cases, sensing range can be up to two times longer from the positive to negative magnetic field, as opposed to convention systems that only measure from zero to a single polarity magnetic field.

Figure 4A:
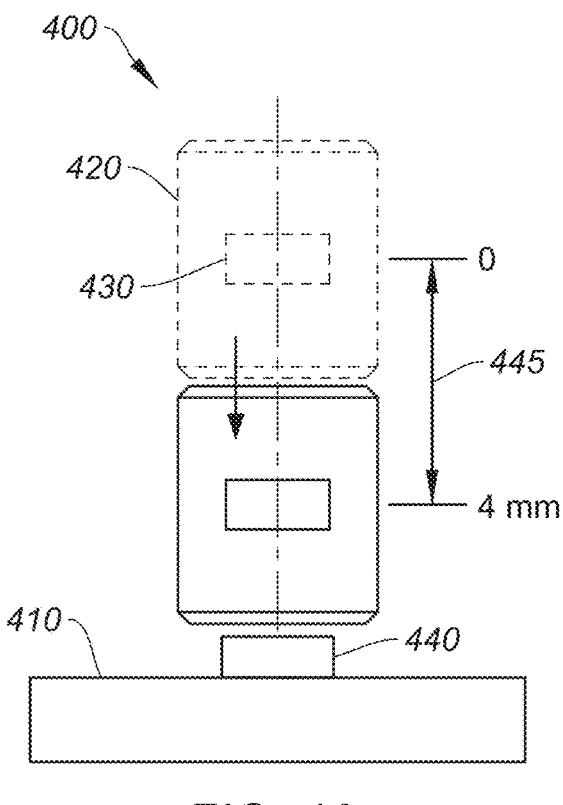
FIG. 4A shows conventional keyswitch including a substrate and a plunger with a magnet coupled thereto.
Figure 4B:
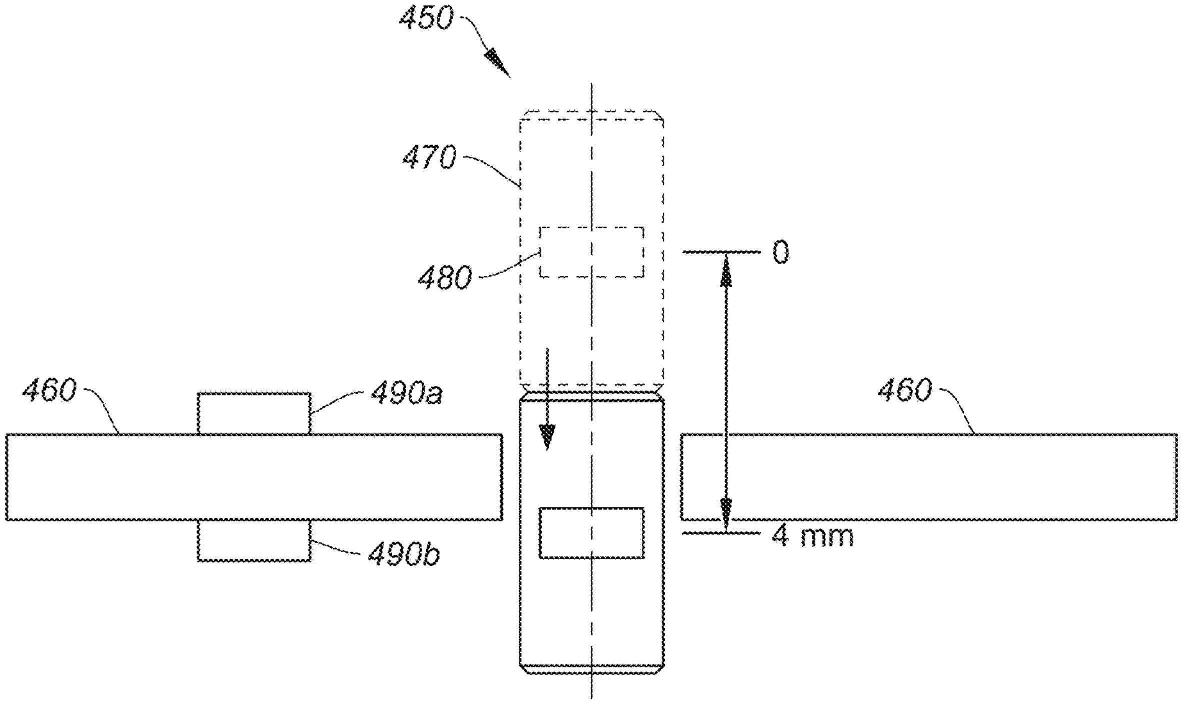
FIG. 4B shows a novel magnetic keyswitch including a substrate and a plunger with a magnet coupled thereto, according to certain embodiments.

FIGS. 4A and 4B show a comparison of a conventional magnetic keyswitch and a magnetic keyswitch with substrate pass-through, according to certain embodiments. In FIG. 4A, conventional keyswitch 400 includes a substrate 410 (e.g., printed circuit board) and a plunger 420 with a magnet 430 coupled thereto. A magnetic field sensor 440 (e.g., Hall sensor) is coupled to substrate 410 and configured in axial alignment with the range of motion 445 of the plunger and/or magnet. Hall sensor 440 is configured to detect a magnetic field (single pole) from a z-direction and is thus positioned directly underneath plunger 420. The plunger remains above the substrate in operation and the sensor measures the magnetic field from one pole of the magnet 430. As noted above, conventional magnetic keyswitch systems may be subject to dead zones where the magnetic element (e.g., magnet 430) is furthest from the sensor and may have a very weak signal (e.g., when depressed 0 mm) and saturation when magnetic 430 is too close to sensor 440 (e.g., when depressed 4 mm), which can result in deleterious readings and non-optimal performance, as further described below at least with respect to FIG. 5.

FIG. 4B shows a novel magnetic keyswitch 450 including a substrate 460 and a plunger 470 with a magnet 480 coupled thereto, according to certain embodiments. Substrate 460 has an opening and the keyswitch plunger 470 is configured to pass through the opening such that the range of motion of the plunger and magnet goes above and below the substrate. A magnetic field sensor 490*a* (e.g., TMR sensor) is coupled to substrate 460 at a location lateral to an axis defined by the range of motion of the plunger and detects the magnetic field of magnet 480 from a lateral direction (rather than a z-direction). Sensor 490*a* can detect both magnetic poles of the magnet as it passes though the substrate. This allows the magnet to be closer to the magnetic sensor over its full range of motion (e.g., 4 mm). Alternatively or additionally, magnet 490*a* may instead be positioned on the bottom of the substrate, and is shown as 490*b*.

By way of example, certain embodiments can include a keyed device (e.g., keyboard) with a substrate (e.g., PCB) defining an opening and a keyswitch (e.g., analog magnetic keyswitch) mounted on the substrate. The keyswitch can include a plunger operable to be depressed and move between a first position and a second position defining a range of motion. A magnet may be coupled to the plunger and when the plunger is depressed, the magnet is operable to pass through the opening of the substrate, such that when the plunger is in the first position, the magnet is configured above the opening in the substrate; and when the plunger is in the second position, at least a portion of the magnet is configured below the opening in the substrate. The keyed device can include a magnetic field sensor coupled to the substrate and configured to detect the magnetic field generated by the magnet over the range of motion of the plunger. In some cases, the magnetic field sensor (e.g., tunneling magnetoresistance (TMR) sensor) detects the magnetic field over a positive range of the magnetic field and a negative range of the magnetic field. In other words, certain embodiments can detect a magnetic field from a first pole (e.g., positive pole) and a second pole (e.g., negative pole) such that a difference measurement approximately doubles the sensing range, as further shown and described below at least with respect to FIGS. 5-7. It should be noted that the measurements (e.g., ADC measurements) may be over a positive range (as shown, e.g., in FIG. 7), however the sensor measurement can still be over positive and negative poles of the detected magnet. The range of motion of the plunger defines an axis, and the magnetic field sensor may be mounted on the substrate at a position lateral and normal to the axis.

Figure 5:
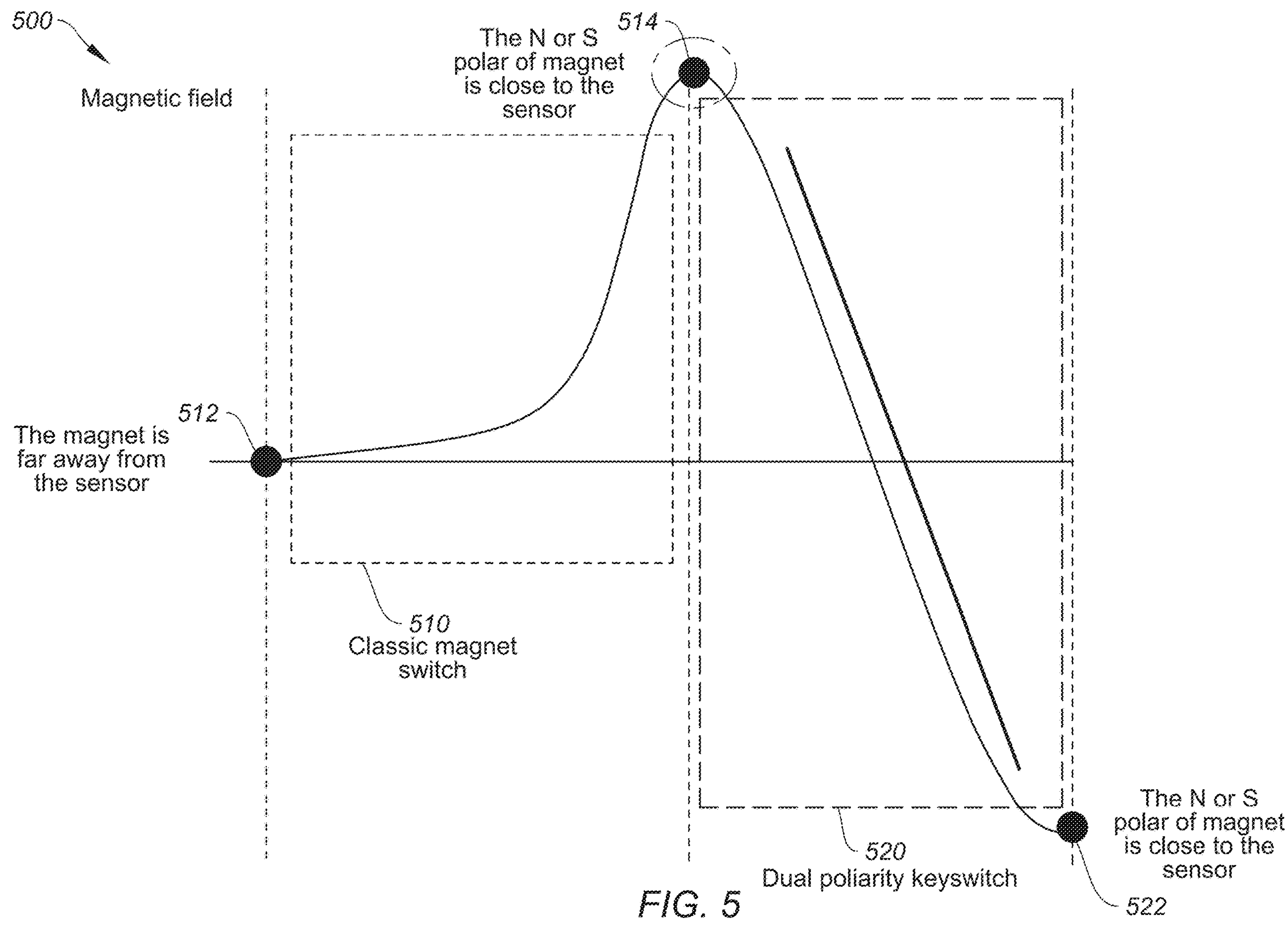
FIG. 5 presents a graph showing performance characteristics for magnetic field detection in a keyed device for conventional magnetic keyswitches and novel magnetic keyswitches, according to certain embodiments.

FIG. 5 presents a graph 500 showing performance characteristics for magnetic field detection in a keyed device for conventional magnetic keyswitches and novel magnetic keyswitches, according to certain embodiments. Curve 510 corresponds to a detected magnetic field curve over a range of motion for a plunger of a conventional magnetic keyswitch (e.g., magnetic field strength vs. distance between the sensor and magnet). The X/Y values shown are not absolute numbers (as shown by way of example in FIG. 7) and may change based on a sensor type and position relative to the magnet; graph 500 is presented to illustrate the tendency and differences of the novel embodiments described herein vs. conventional designs in the market, as would be appreciated by one of ordinary skill in the art with the benefit of this disclosure. When the plunger is not depressed (position 512), the magnet is at its farthest position from the sensor and the corresponding magnetic field strength is low, which may result in poor, inconsistent, and unreliable sensor readings, commonly referred to as a "dead zone." When the plunger is fully depressed (position 514), a single pole of the magnet (i.e., N or S) is at its closest position to the sensor, which may result in too strong of a signal (e.g., saturation) that can also cause unreliable sensor readings. The magnetic field sense curve 510 exhibits nonlinear characteristics over the range of motion of the plunger with very small changes in the detected magnetic flux over a first portion of curve 510 (e.g., 0 mm to 2 mm) and very rapid changes during a second portion of curve 510 (e.g., 2 mm to 4 mm), which can deleteriously impact measurement accuracy.

Curve 520 corresponds to a detected magnetic field curve over a range of motion for a plunger of a dual polarity keyswitch, according to certain embodiments. In contrast to conventional keyswitches that utilize single pole sensing (see, e.g., FIG. 4A), dual polarity keyswitches, as described herein (see, e.g., FIG. 4B), detect a magnetic field of the magnet (or magnetic element(s)) from both magnetic poles. For instance, when the plunger is not depressed (position 514), the magnet 480 is configured above the substrate 460 and a magnetic field from the first pole (e.g., N magnetic pole) of magnet 480 is detected, and when the plunger is fully depressed (position 522), the magnet 480 is configured below the substrate 460 and a magnetic field from the second pole (e.g., S magnetic pole) of magnet 480 is detected. As a result, the sensing range can be two times larger than magnetic keyswitches with single pole detection, which provides double the sensing resolution and a significantly more linear operating range, which can reduce computational complexity (e.g., conventional magnetic keyswitches have to account for significant nonlinearity) and improve measurement accuracy, as more data points can make linear calibration computationally easier to calculate. In some embodiments, magnetic field measurements may be offset from the closest position of the magnet to the sensor at both poles to avoid saturation. In other words, because the signal range for dual pole detection is longer, there is more available range that may be adjusted to avoid saturation and maintain enough ADC delta for good resolution, as would be appreciated by one of ordinary skill in the art with the benefit of this disclosure.

Single-Pole and Double-Pole Keyswitch Detection

Certain aspects of the invention are directed to keyswitch detection in keyed devices configured to support multiple keyswitch types including single-pole and double-pole detection systems. The following examples illustrate how keyswitch can be detected based on one or more of a number of criteria including, but not limited to, initial voltages (e.g., plunger at rest), end voltages (e.g., plunger fully pressed), voltage changes mid-press (e.g., at 35% pressed and analyzing "swing direction").

Figure 6:
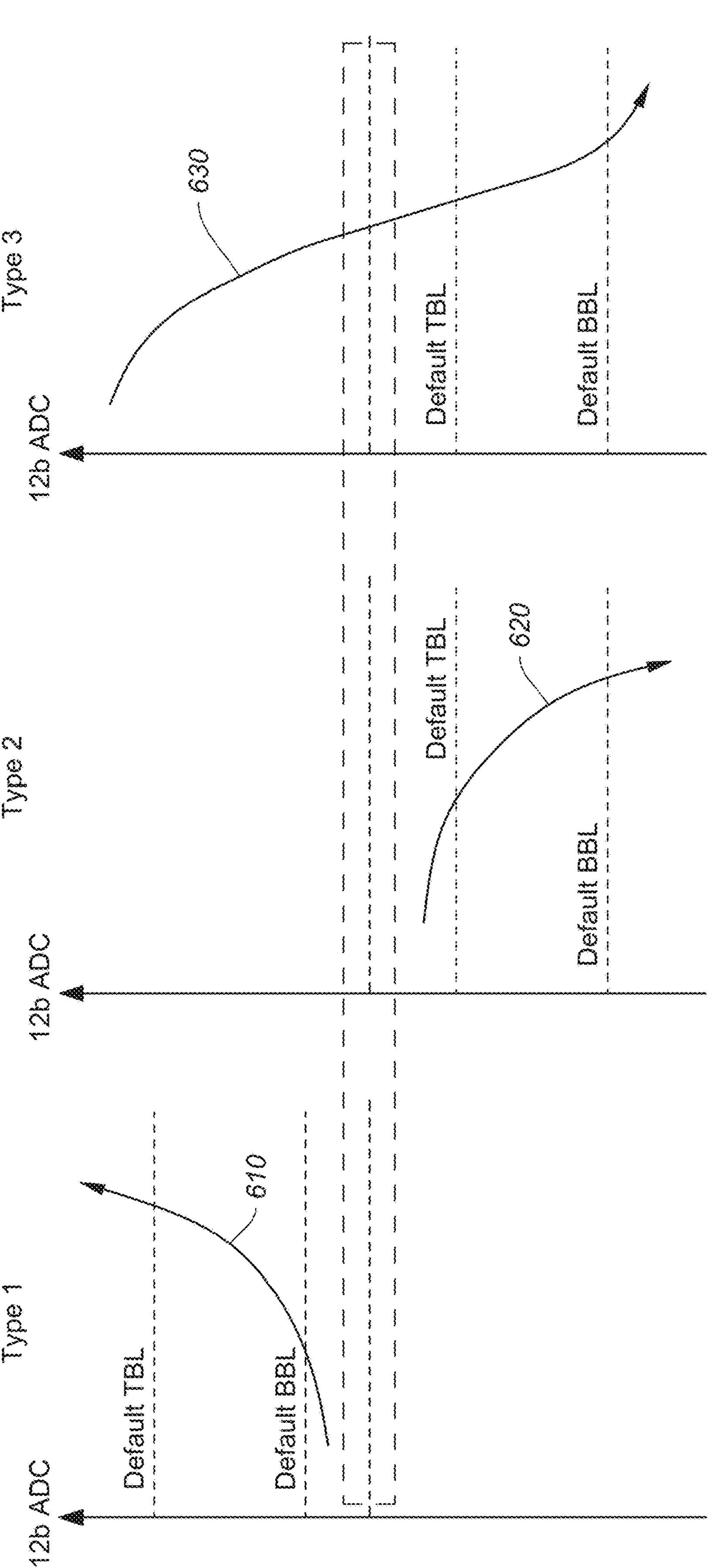
FIG. 6 shows various keyswitch operational curves of different keyswitch types.

FIG. 6 shows various keyswitch operational curves of different keyswitch types. In a first keyswitch type (Type 1, curve 610), a magnetic field for a single magnetic pole (e.g., north pole) is detected over a range of motion. In a second keyswitch type (Type 2, curve 620), a magnetic field for a single magnetic pole (e.g., south pole) is detected over a range of motion, which may be similar to Type 1 with the magnet flipped so the sensor reads the opposite polarity. Keyswitch types 1 and 2 may correspond to conventional magnetic keyswitch types, as shown in FIG. 4A. In a third keyswitch type (Type 3, curve 630), a magnetic field for a double magnetic pole (e.g., north and south pole) is detected over a range of motion. FIG. 4B shows an example of certain embodiments of a type 3 double magnetic pole keyswitch type. As noted above, double magnetic pole keyswitches can have double the voltage range as compared to single magnetic pole keyswitches and thus may have significantly improved measurement resolution and longer linear region of detection.

Figure 7:
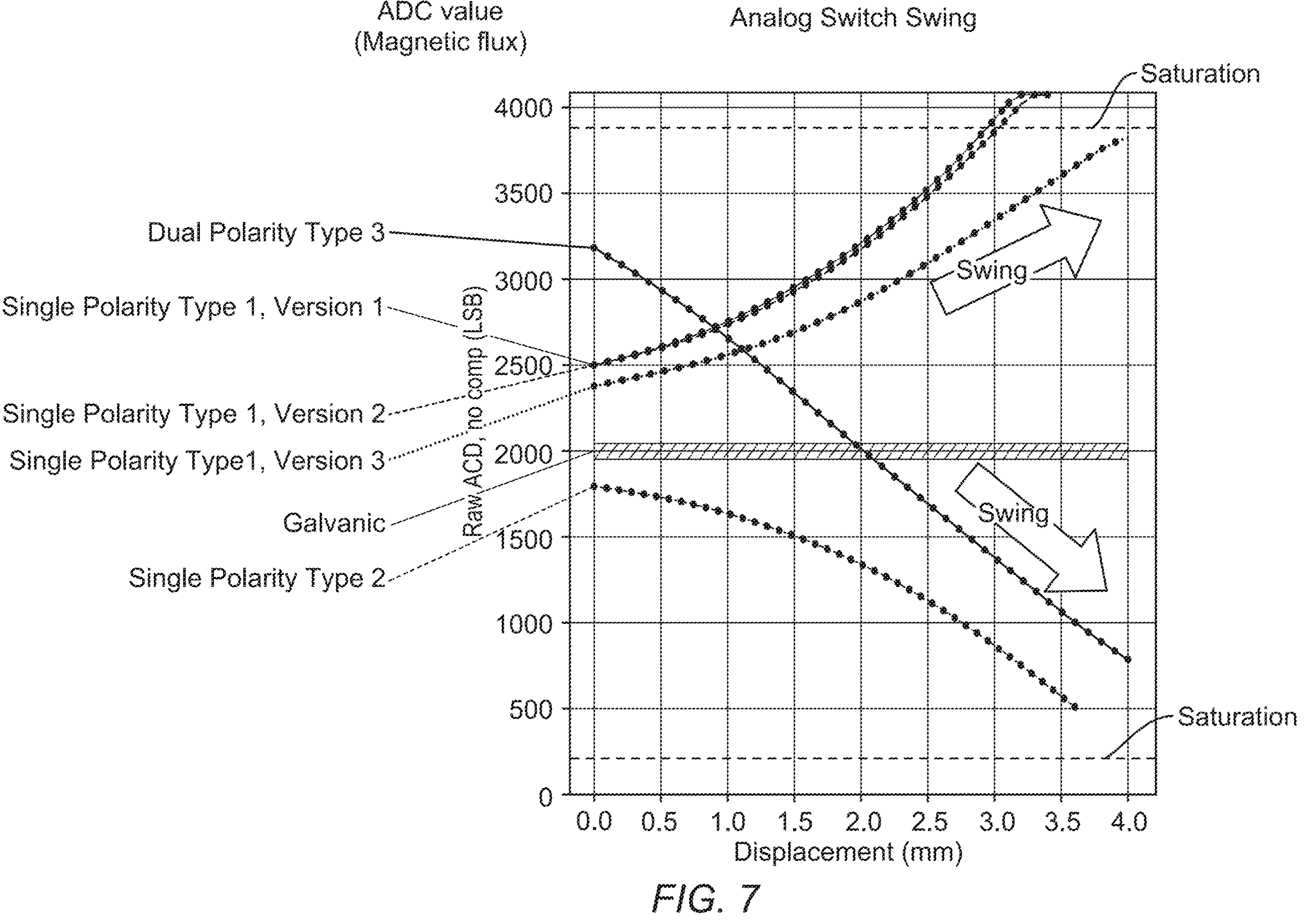
FIG. 7 is a graph showing magnetic sense curves for a number of keyswitch types.

FIG. 7 is a graph 700 showing magnetic sense curves for a number of keyswitch types. Graph 700 shows an ADC voltage value that corresponds to a measured magnetic flux (e.g., an ADC value measured in voltage) over a displacement for a keyswitch (e.g., 0-4 mm travel). As noted above, a sensor will sense the magnetic flux of the magnetic field generated by the magnet(s). In this example, an MCU ADC can receive the ADC values (LSB units). An LSB is approximately 1.65 V based on a 3.3 V reference voltage and 12-bit resolution ADC. Magnetic sense curves can be used to determine a type of keyswitch installed in keyed device so that the system can correctly calibrate measurements to accommodate the keyswitches range of operation (e.g., different switches may have a different calibration table, as would be appreciated by one of ordinary skill in the art with the benefit of this disclosure).

Keyswitch Type 1, version 1 is a single magnetic pole keyswitch with an initial voltage (e.g., plunger at rest) of about 2500 LSB, and an end voltage increasing to about 4000 LSB at 3.4 mm depressed. The full range of detection is approximately 3 mm before saturation (3800 [units]) where the ADC range is approximately 1300. Keyswitch Type 1, version 2 is a single magnetic pole keyswitch with an initial voltage of about 2500 LSB, and an end voltage increasing to about 4000 LSB at 3.4 mm depressed. The full range of detection is approximately 3 mm before saturation with an ADC range of 1300. Type 1, versions 1 and 2 are very similar and may be calibrated in a similar manner for operation.

Keyswitch Type 1, version 3 is a single magnetic pole keyswitch with an initial voltage (e.g., plunger at rest) of about 2450 LSB, and an end voltage of about 3800 LSB at about 4 mm depressed. The full range of detection is approximately 4 mm before saturation with an ADC range of about 1800. The galvanic keyswitch does not utilize magnetic sensing and measures at a constant 2000.

Keyswitch Type 2 is a single magnetic pole keyswitch with an initial voltage (e.g., plunger at rest) of about 1800 LSB, and an end voltage decreasing to about 500 LSB at 3.6 mm depressed. The full range of detection is approximately 3.6 mm before saturation with an ADC range of about 1300.

Keyswitch Type 3 is a double magnetic pole keyswitch with an initial voltage (e.g., plunger at rest) of about 3200 LSB, and an end voltage decreasing to about 800 LSB at 4.0 mm depressed. A full keystroke of 4.0 mm is possible with about 800 LSB of headroom before reaching saturation in either polar direction. The ADC range is approximately 2400, which is nearly double the range of Type 1 and Type 2 single polarity keyswitches. It should be noted that keyswitch Types 1 and 2 exhibit nonlinear magnetic field curves of varying degrees over the full range of motion, and some have shortened ranges of detection because of saturation. Type 3 has a substantially linear range of operation over its full range of motion.

Figure 8:
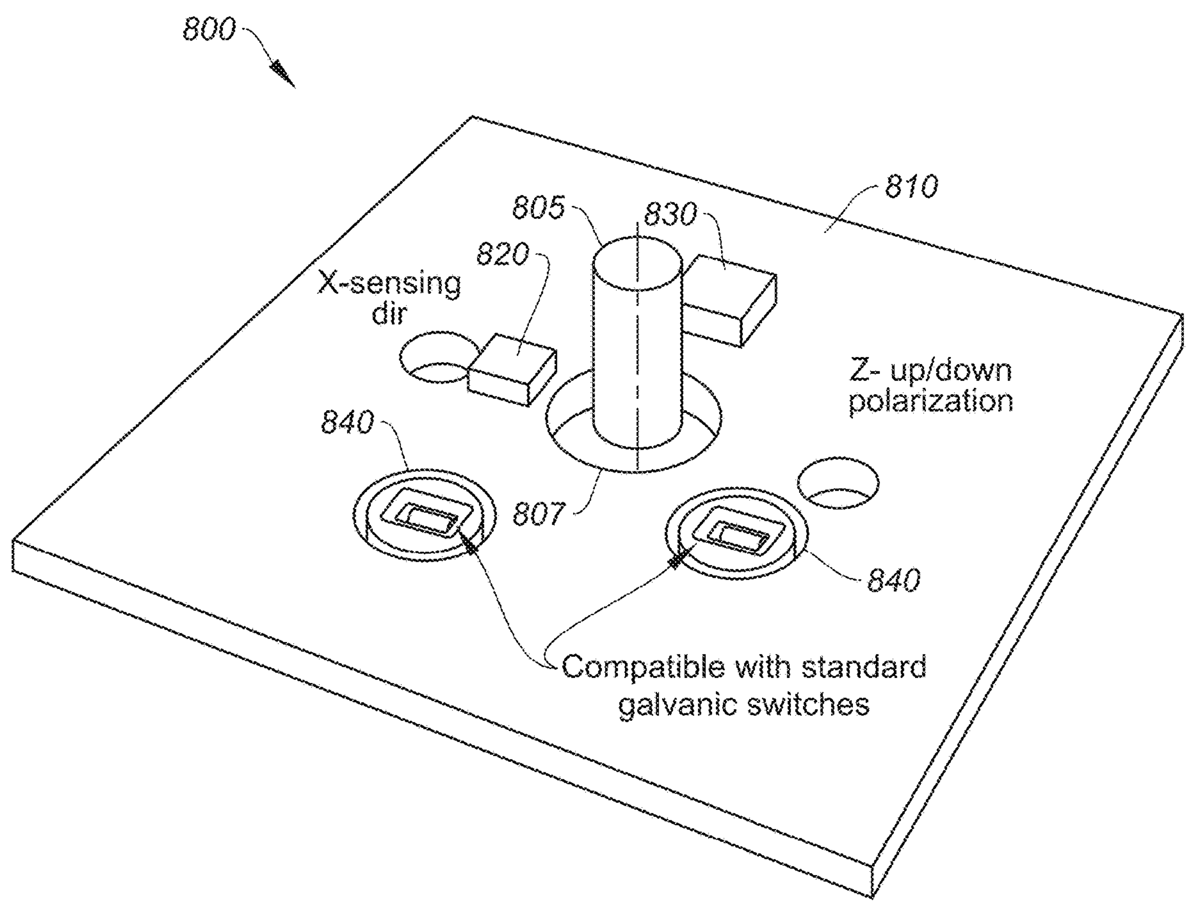
FIG. 8 shows a substrate for a keyswitch system, according to certain embodiments.

FIG. 8 shows a substrate for a keyswitch system 800, according to certain embodiments. Keyswitch system 800 includes a substrate 810 with mounting holes 840. A plunger and magnet 805 can pass through the hole 807 that passes through substrate 810. Sensor 820 and light emitting diode (LED) 830 are mounted on a top surface of substrate 810. Sensor 820 may be mounted laterally and normal to the axis defined by the range of motion of the plunger and magnet 805 on the top of substrate 810 (as shown) or on the bottom. Different mounting locations of sensor 820 are possible, including different mounting distances and directions relative to plunger and magnet 805, as would be appreciated by one of ordinary skill in the art with the benefit of this disclosure. Keyswitch system 800 may accommodate mounting for a variety of keyswitch types, including conventional MX galvanic switches, and embodiments described herein.

Figure 9:
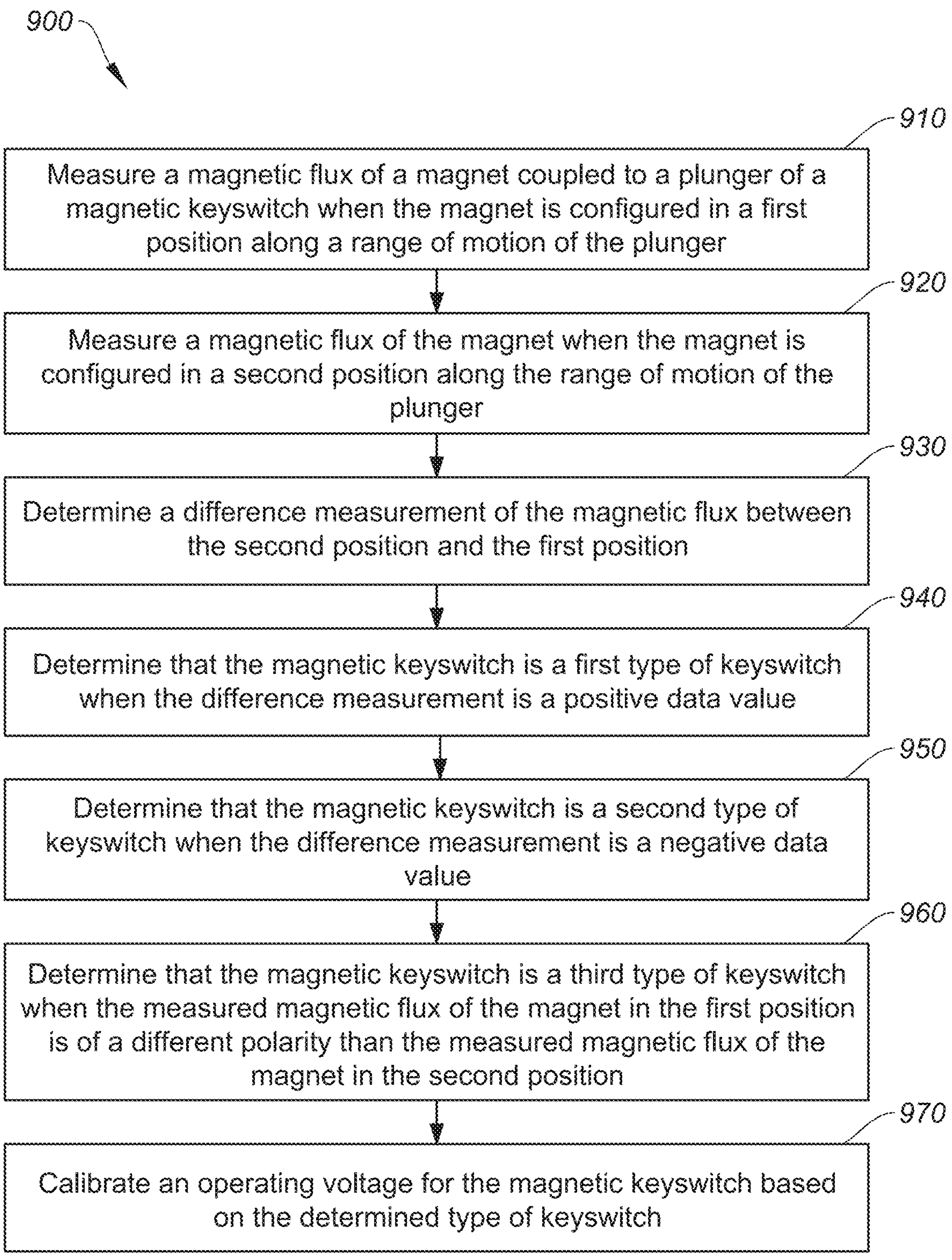
FIG. 9 is a simplified flow chart showing aspects of a method for operating a keyed device, according to certain embodiments.

FIG. 9 is a simplified flow chart showing aspects of a method 900 for operating a keyed device (e.g., keyboard), according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by aspects of system 200, system 300, or a combination thereof.

At operation 910, method 900 can include measuring a magnetic flux of a magnet coupled to a plunger of a magnetic keyswitch (e.g., analog keyswitch) when the magnet is configured in a first position along a range of motion of the plunger, according to certain embodiments.

At operation 920, method 900 can include measuring a magnetic flux of the magnet when the magnet is configured in a second position along the range of motion of the plunger, according to certain embodiments. In some embodiments, the first position corresponds to a plunger of the keyswitch being between 0 and 20% fully pressed along the range of motion (typically closer to 0%), and wherein the second position corresponds to the plunger of the keyswitch being between 80-100% fully pressed along the range of motion (typically closer to 100%). In some embodiments, measuring of the magnetic flux of the magnet is performed by a tunneling magnetoresistance (TMR) sensor or other magnetic sensor that can be configured to measure from a lateral position and normal to the range of motion of the plunger. In some embodiments, the TMR sensor and the magnetic keyswitch are mounted on a substrate (e.g., PCB), the range of motion of the plunger defines an axis, and the TMR sensor is mounted on a substrate at a position lateral and normal to the axis.

At operation 930, method 900 can include determining a difference measurement of the magnetic flux between the second position and the first position, according to certain embodiments.

At operation 940, method 900 can include determining that the magnetic keyswitch is a first type of keyswitch when the difference measurement is a positive data value, according to certain embodiments.

At operation 950, method 900 can include determining that the magnetic keyswitch is a second type of keyswitch when the difference measurement is a negative data value, according to certain embodiments.

At operation 960, method 900 can include determining that the magnetic keyswitch is a third type of keyswitch when the measured magnetic flux of the magnet in the first position is of a different polarity than the measured magnetic flux of the magnet in the second position, according to certain embodiments.

At operation 970, method 900 can include calibrating an operating voltage for the magnetic keyswitch based on the determined type of keyswitch, according to certain embodiments.

It should be appreciated that the specific steps illustrated in FIG. 9 provide a particular method 900 for operating a keyed device, according to certain embodiments. Other sequences of steps may also be performed according to alternative embodiments. For instance, in some embodiments, an alternative method may include (1) measure/detect the initial ADC value for magnetic field detection; (2) measure/detect a delta of the swing direction, which corresponds to whether the LSB value goes up (positive direction) or goes down (negative direction); and (3) detect the end ADC value. By way of example, detection (1) can detect the initial ADC difference between keyswitches, which may help identify the keyswitch type (e.g., comparing starting points of keyswitch types 1-5 of FIG. 7), detection (2) can detect the ADC delta during a shorter or longer period along the range of motion—this "swing" can help determine the keyswitch type by the direction of the slope (e.g., positive or negative) and delta rate of change (e.g., the different between keyswitch Types 1 and 3 of FIG. 7), and detection (3) may check if the ADC signal is saturated, which can differentiate certain keyswitches (e.g., types 1 and 2 vs. type 3 of FIG. 7). One of ordinary skill in the art with the benefit of this disclosure would appreciate the many modifications, variations, and alternative embodiments thereof. In some embodiments, if the magnetic field sensor can detect both X and Y simultaneously, detection (2) can help discriminate the keyswitches. If there is more than one sensor (e.g., two sensor—one on either side of the plunger/magnet), more data can be captured and used for keyswitch identification. Two direction sensing may be used for detecting keyswitches with multiple magnets. Furthermore, additional steps may be added or removed depending on the particular application. Any combination of changes can be used and one of ordinary skill in the art with the benefit of this disclosure would understand the many variations, modifications, and alternative embodiments thereof.

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A keyed device comprising:

a substrate defining an opening;

a keyswitch mounted on the substrate, the keyswitch including a plunger operable to be depressed and move between a first position and a second position defining a range of motion;

a magnet coupled to the plunger, wherein when the plunger is depressed, the magnet is operable to pass through the opening of the substrate, such that:

when the plunger is in the first position, the magnet is configured above the opening in the substrate; and when the plunger is in the second position, at least a portion of the magnet is configured below the opening in the substrate; and a magnetic field sensor coupled to the substrate and configured to detect a magnetic field generated by the magnet over the range of motion of the plunger, wherein the range of motion of the plunger defines an axis, and wherein the magnetic field sensor is mounted on the substrate at a position lateral and normal to the axis.

2. The keyed device of claim 1 wherein the magnetic field sensor detects the magnetic field over a positive range of the magnetic field and a negative range of the magnetic field.

3. The keyed device of claim 2 wherein the magnetic field sensor is a tunneling magnetoresistance (TMR) sensor.

4. The keyed device of claim 1 wherein the substrate is a printed circuit board (PCB).

5. The keyed device of claim 1 wherein the keyswitch is an analog keyswitch.

6. The keyed device of claim 1 wherein the keyed device is a keyboard.

7. A system comprising:

a substrate with a surface that defines an opening;

a keyswitch mounted on the substrate;

a plunger with a magnet configured thereon, the plunger operable to depressed over a range of motion that passes through the opening of the substrate; and a magnetic field sensor coupled to the substrate and operable to:

detect a magnetic field of a first polarity when the magnet is above the opening and the magnetic field sensor;

detect a magnetic field of a second polarity opposite the first polarity when the magnet is below the opening and the magnetic field sensor; and generate a signal corresponding to an amount that the plunger is depressed over the range of motion based on a magnitude of the detected magnetic field in the first and second polarities, wherein the range of motion of the plunger defines an axis, and wherein the magnetic field sensor is mounted on the substrate at a position lateral and normal to the axis.

8. The system of claim 7 wherein the magnetic field sensor is a tunneling magnetoresistance (TMR) sensor.

9. The system of claim 7 wherein the substrate is a printed circuit board.

10. The system of claim 7 wherein the keyswitch is an analog keyswitch.

* * * * *